United States Patent
Romero

(10) Patent No.: US 10,348,614 B2
(45) Date of Patent: Jul. 9, 2019

(54) DEBUGGING DEVICE WITH SERIAL AND ETHERNET CONSOLE MODULE AND HARDWARE BYPASS

(71) Applicant: INTERNATIONAL BUSINESS MACHINES CORPORATION, Armonk, NY (US)

(72) Inventor: Edward A. Romero, Atlanta, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 19 days.

(21) Appl. No.: 15/447,904

(22) Filed: Mar. 2, 2017

(65) Prior Publication Data

US 2018/0254963 A1 Sep. 6, 2018

(51) Int. Cl.
*H04L 12/26* (2006.01)
*H04L 12/709* (2013.01)
*H04W 8/22* (2009.01)

(52) U.S. Cl.
CPC ........ *H04L 45/245* (2013.01); *H04L 43/0817* (2013.01); *H04W 8/22* (2013.01); *H04L 43/0823* (2013.01)

(58) Field of Classification Search
CPC . H04L 43/12; H04L 43/0805; H04L 43/0823; H04L 45/245; H04W 8/22
See application file for complete search history.

(56) References Cited

U.S. PATENT DOCUMENTS

| | | | | |
|---|---|---|---|---|
| 6,441,931 B1 * | 8/2002 | Moskovich | ............. | H04L 41/00 398/9 |
| 7,299,277 B1 * | 11/2007 | Moran | ................ | H04L 41/5022 370/230 |
| 9,158,661 B2 | 10/2015 | Blaine et al. | | |

(Continued)

OTHER PUBLICATIONS

Microsoft et al.; "Operating System Kernel Debugging Using Network Connectivity"; http://ip.com/IPCOM/000172120D; Jun. 2008, 5 pages.

(Continued)

*Primary Examiner* — Asad M Nawaz
*Assistant Examiner* — Zhaohui Yang
(74) *Attorney, Agent, or Firm* — Tutunjian & Bitetto, P.C.; Jeffrey S. LaBaw

(57) ABSTRACT

A method is provided that includes accessing, by a debugging device associated with an external user device, (i) a serial console of a hardware network device, and (ii) a management Ethernet port of the hardware network device. The method includes providing, by the debugging device, (i) a serial console interface from the serial console of the hardware network device to the external user device, and (ii) a management Ethernet interface from the management Ethernet port of the hardware network device to the external user device. The method includes receiving, by serial console interface and the management Ethernet interface of the debugging device, user input from the external user device. The method includes sending, using a hardware bypass in the debugging device, Ethernet management traffic from the hardware network device to the external user device through an internal network, responsive to the debugging device improperly operating.

16 Claims, 4 Drawing Sheets

(56) References Cited

U.S. PATENT DOCUMENTS

| | | | |
|---|---|---|---|
| 2005/0259611 A1* | 11/2005 | Bhagwat | H04L 43/00 370/328 |
| 2010/0180021 A1 | 7/2010 | Abdul et al. | |
| 2011/0231570 A1* | 9/2011 | Altekar | H04L 12/4633 709/236 |
| 2015/0339249 A1 | 11/2015 | Dharmadhikari et al. | |

OTHER PUBLICATIONS

IBM; "Asynchronous Serial Interface Attached to Emulated Software"; http://ip.com/IPCOM/000153911D; Jun. 2007, 3 pages,.

* cited by examiner

DEBUGGING DEVICE WITH SERIAL AND ETHERNET CONSOLE MODULE AND HARDWARE BYPASS

BACKGROUND

Technical Field

The present invention relates generally to electrical connectors and, in particular, to a debugging device with a serial and Ethernet console module and a hardware bypass.

Description of the Related Art

Network administrators require the ability for quick and easy remote access to the management and serial console interfaces of their network devices (e.g., network security products, network switches, servers and so forth). Customers typically require an engineer to go on site to be able to view the serial console for debugging as they have to connect the server to a Personal Computer (PC) or laptop to be able to view it remotely. This process is very costly, and most customers would rather return the device than have to get debug logging performed from the faulty device.

SUMMARY

According to an aspect of the present invention, a method is provided. The method includes accessing, by a debugging device associated with an external user device, (i) a serial console of a hardware network device, and (ii) a management Ethernet port of the hardware network device. The method further includes providing, by the debugging device, (i) a serial console interface from the serial console of the hardware network device to the external user device, and (ii) a management Ethernet interface from the management Ethernet port of the hardware network device to the external user device. The method also includes receiving, by serial console interface and the management Ethernet interface of the debugging device, user input from the external user device. The method additionally includes sending, using a hardware bypass in the debugging device, Ethernet management traffic from the hardware network device to the external user device through an internal network, responsive to the debugging device improperly operating.

According to another aspect of the present invention, a debugging device is provided. The debugging device is associated with an external user device and is for interfacing a hardware network device with the external user device. The debugging device includes a serial port for accessing a serial console of the hardware network device. The debugging device further includes an Ethernet port for accessing a management Ethernet port of the hardware network device. The debugging device also includes a serial console interface from the serial console of the hardware network device to the external user device. The debugging device additionally includes a management Ethernet interface from the management Ethernet port of the hardware network device to the external user device. The serial console interface and the management Ethernet interface are configured to interact with the hardware network device through the external user device. The debugging device further includes a hardware bypass configured to send Ethernet management traffic from the hardware network device to the external user device through an internal network, responsive to the debugging device improperly operating.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to a debugging device with a serial and Ethernet console module and a hardware bypass. The serial and Ethernet console module of the debugging device is capable of interfacing a network hardware device with (an application on) a user device. The network hardware device can be, for example, but is not limited to, a network security product, a network switch, a server, and so forth. The user device can be, for example, but is not limited to, a smartphone, a personal computer, a tablet, and so forth. Such interfacing can be provided wirelessly (e.g., WIFI, Bluetooth®, etc.) or using a wired technique (e.g., Ethernet, etc.).

The present invention allows for redundancy in case of failure by implementing a hardware bypass on the management port, thus avoiding any disruption to the Ethernet port management traffic. The user of the user device can be, for example, a technician, a network administrator, a network user, and so forth.

As used herein, the term "module" can refer to a hardware element which may or may not include a processor, depending upon the particular element and the particular implementation, as readily appreciated by one of ordinary skill in the art. Moreover, while certain types of communication technologies/protocols are described herein such as, for example, WIFI, Ethernet, and so forth, the present invention is not limited to such communication technologies/protocols and, thus, other communication technologies/protocols can also be used given the teachings of the present invention provided herein, while maintaining the spirit of the present invention. Such other communication technologies can include, but are not limited to, for example, Bluetooth®, fiber optics, and so forth.

Figure 1:
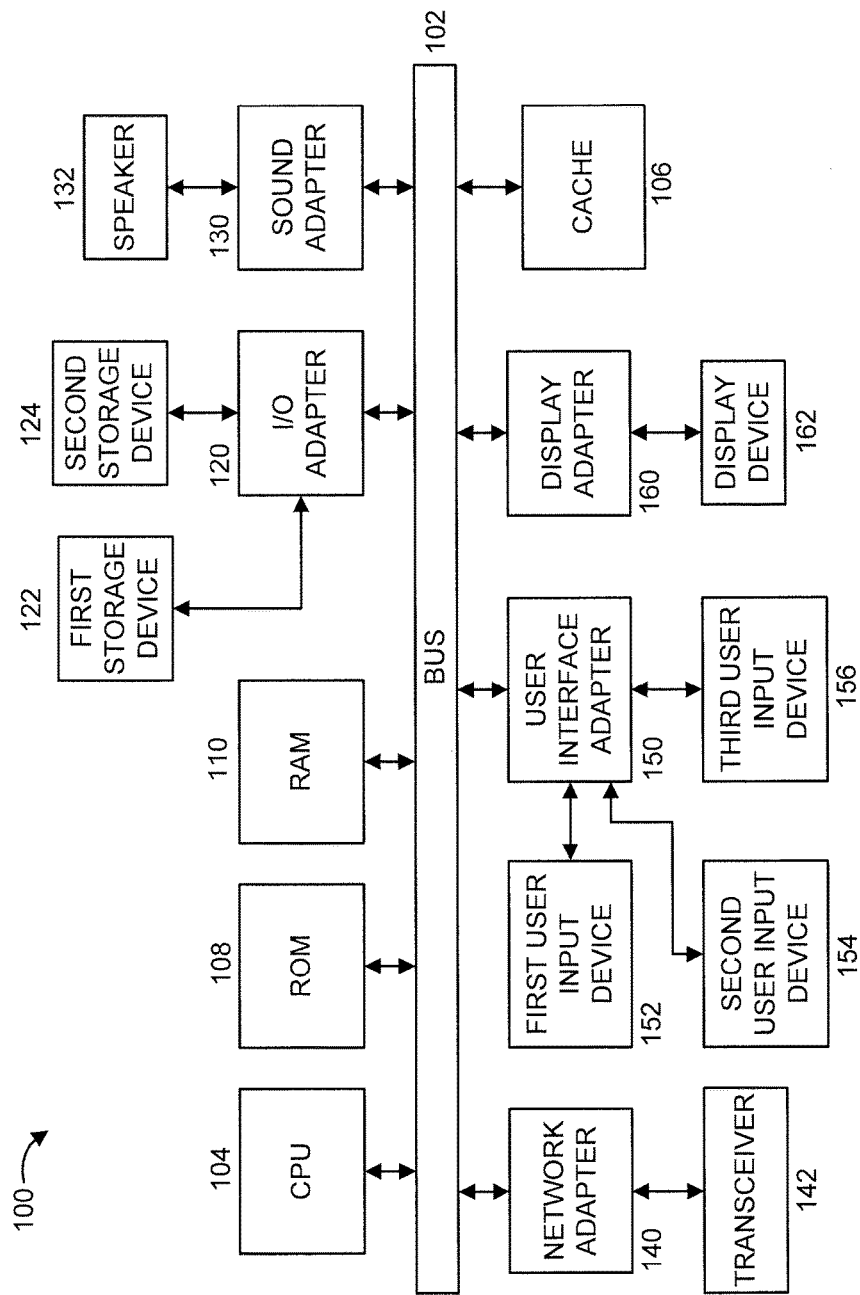
FIG. 1 shows an exemplary processing system 100 to which the present invention may be applied, in accordance with an embodiment of the present invention.

FIG. 1 shows an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver (e.g., a WIFI or other wireless technology transceiver) 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a connector (e.g., a RJ45 connector), a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Those and other variations of the processing system 100 are readily contemplated by one of ordinary skill in the art given the teachings of the present invention provided herein.

Figure 2:
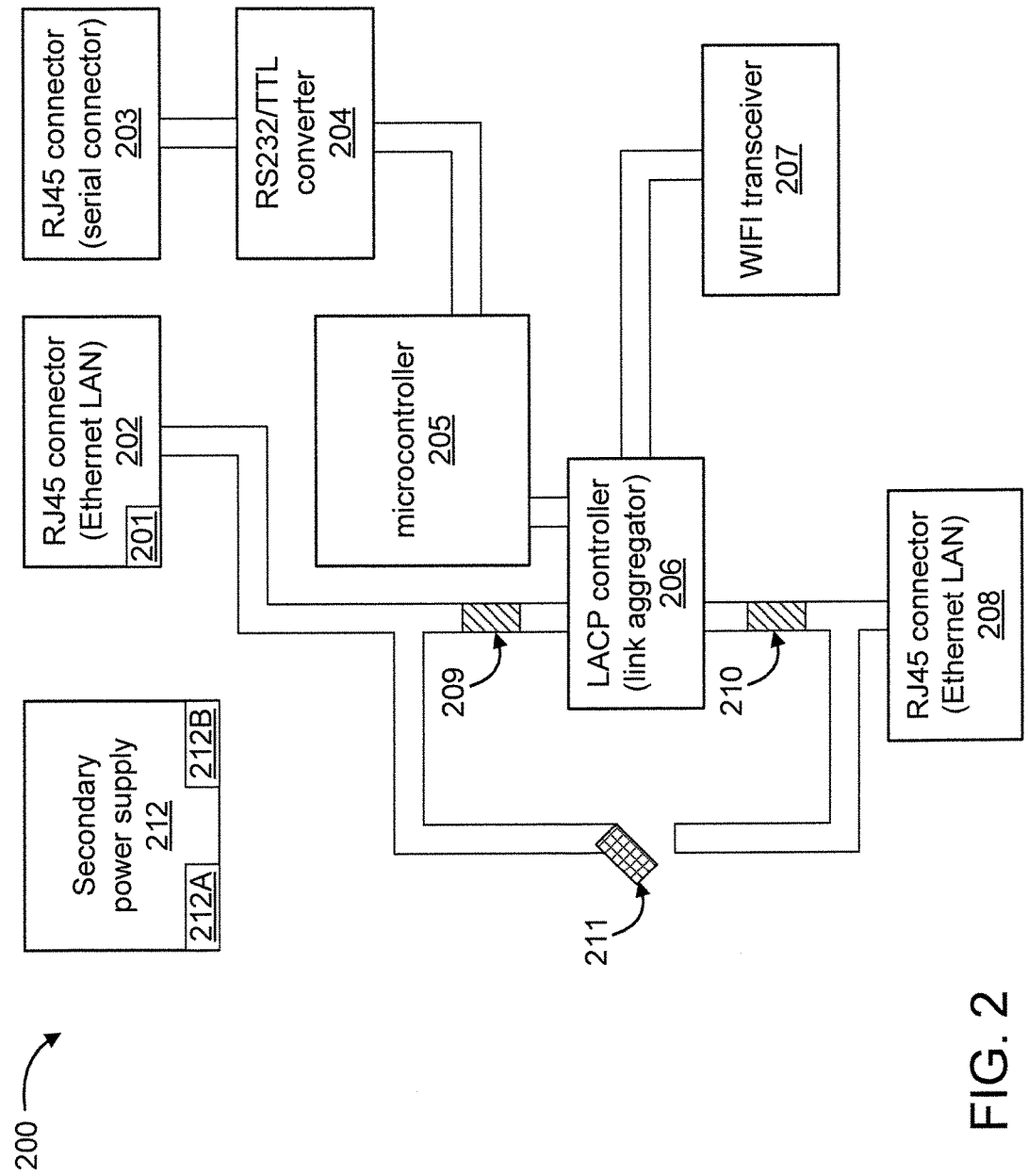
FIG. 2 shows an exemplary debugging device 200 with serial and Ethernet console modules and a hardware bypass, in accordance with an embodiment of the present invention.

Moreover, it is to be appreciated that device 200 described below with respect to FIG. 2 is a device for implementing respective embodiments of the present invention. Part or all of processing system 100 may be implemented in one or more of the elements of device 200.

Figure 3:
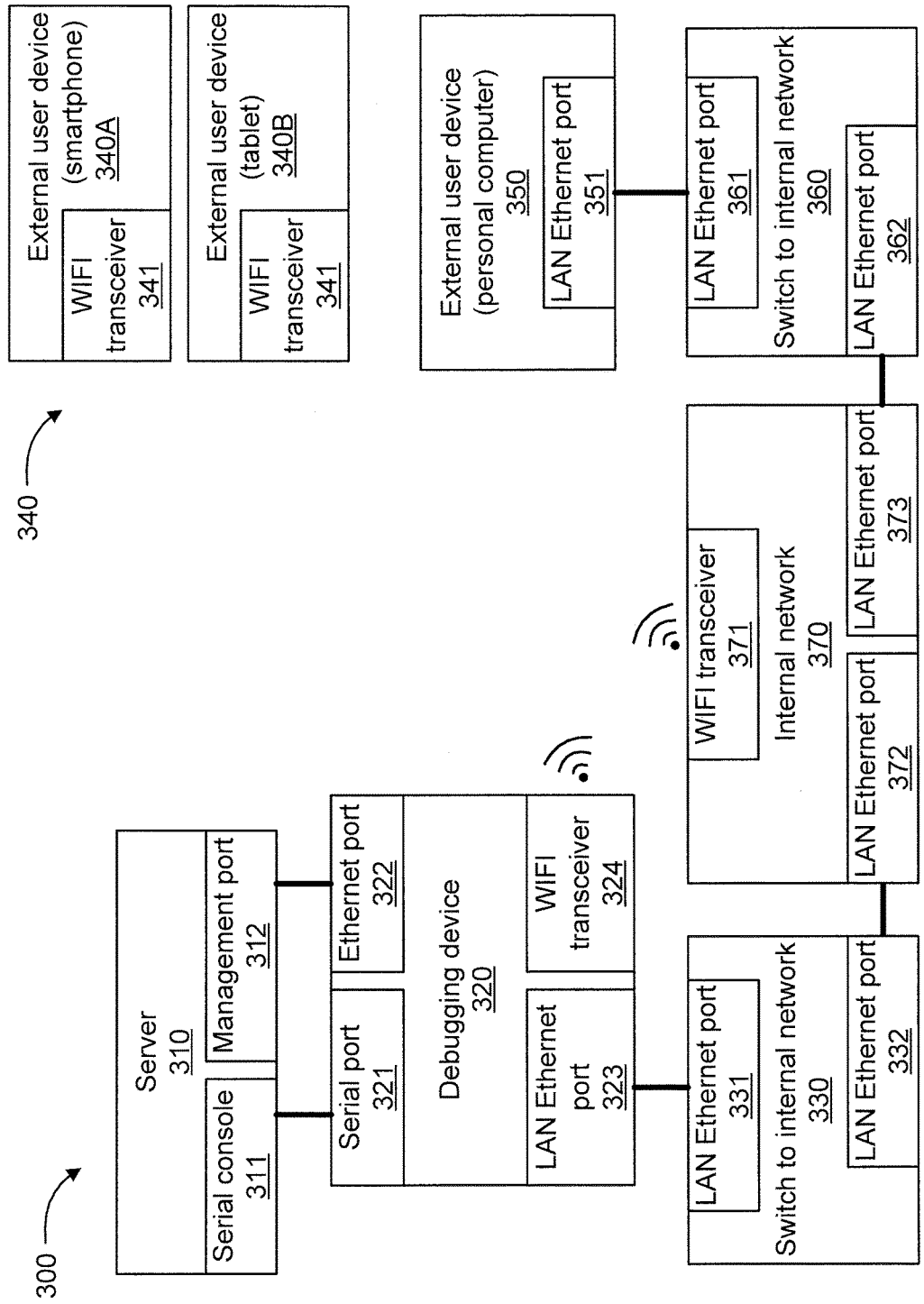
FIG. 3 shows an exemplary environment 300 to which the present invention can be applied, in accordance with an embodiment of the present invention.

Also, it is to be appreciated that environment 300 described below with respect to FIG. 3 is an environment for implementing respective embodiments of the present invention. Part or all of processing system 100 may be implemented in one or more of the elements of environment 300.

Figure 4:
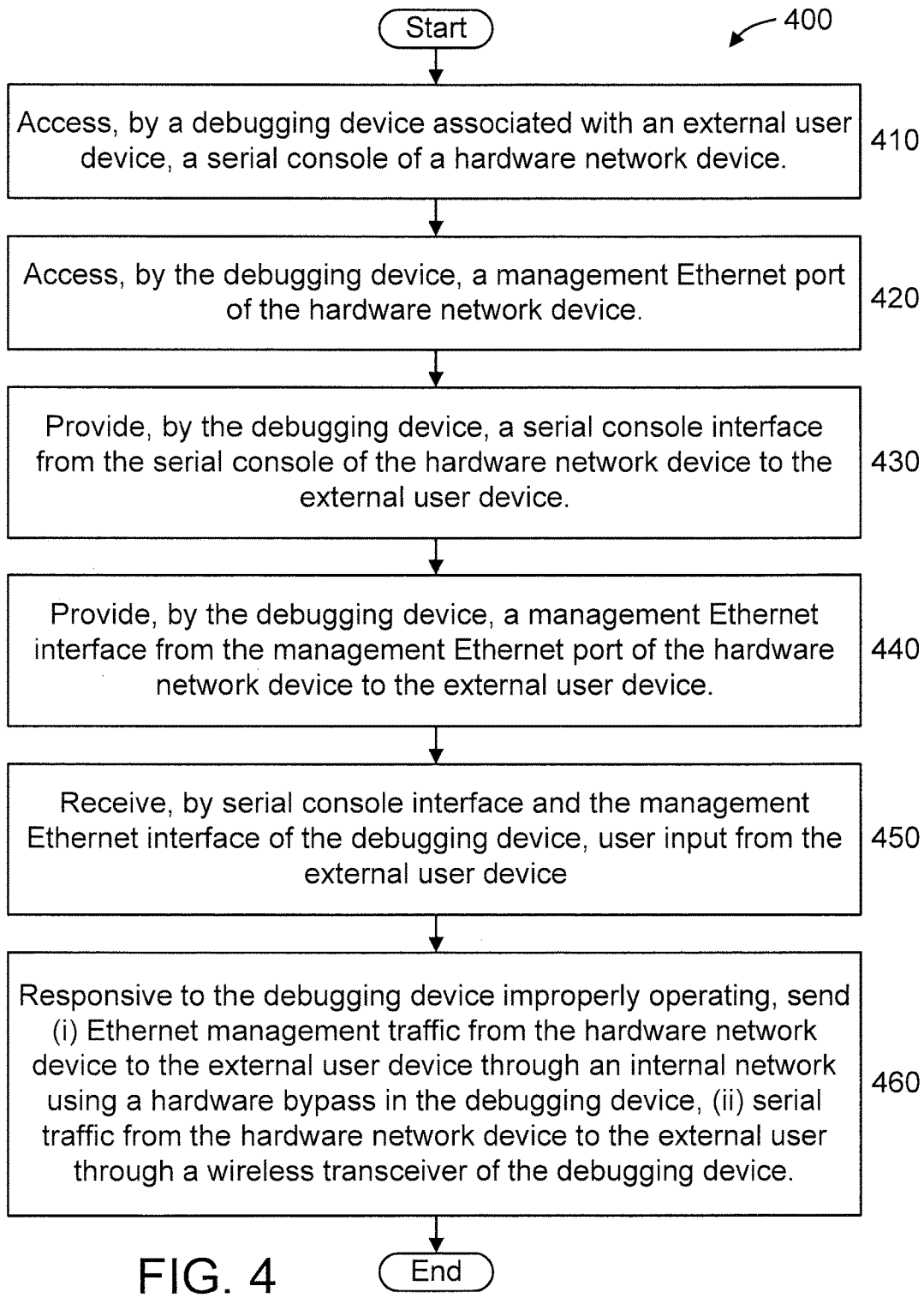
FIG. 4 shows an exemplary method 400 for providing a hardware bypass in case of a debugging device failure, in accordance with an embodiment of the present invention.

Further, it is to be appreciated that processing, system 100 may perform at least part of the method described herein including, for example, at least part of method 400 of FIG. 4. Similarly, part or all of device 200 may be used to perform at least part of method 400 of FIG. 4. Also, part or all of environment 300 may be used to perform at least part of method 400 of FIG. 4.

FIG. 2 shows an exemplary debugging device 200 with serial and Ethernet console modules and a hardware bypass, in accordance with an embodiment of the present invention.

The debugging device 200 includes a main power supply 201, a RJ45 connector (Ethernet Local Area Network (LAN)) 202, a RJ45 connector (serial connector) 203, an RS232/TTL converter 204, a microcontroller 205, a Link Aggregation Control Protocol (LACP) controller (link aggregator) 206, a WIFI transceiver 207, a RJ45 connector (LAN Ethernet) 208, an open on failure segment 209, an open on failure segment 210, a close on failure segment 211, and a secondary power supply 212.

The RS232/TTL converter 204 can be, for example, but is not limited to, a MAX232 integrated circuit that converts from RS232 to TTL and from TTL to RS232.

The secondary power supply 212 includes a battery 212A and a power socket 212B. The power socket 212B is for charging the battery.

Upon detecting a failure in the operation of the debugging device 200 (e.g., a power failure), the open on failure segments 209 and 210 open (that is, create an open circuit condition) while the close on failure segment 211 close (that is, create a closed circuit condition), resulting in an LAN Ethernet bypass pathway from the RJ45 connector (LAN Ethernet) 208 being operatively coupled to the RJ45 connector (LAN Ethernet) 202, thus bypassing the LACP controller (link aggregator) 206 and so forth (noting that the LAN Ethernet bypass would not occur absent the detection of the failure in the operation of the debugging device). That is, upon the detection of a failure, a direct link is created between RJ45 connector (LAN Ethernet) 208 and RJ45 connector (LAN Ethernet) 202. Thus, upon self-detecting the failure in its proper operation, the debugging device 200 can actuate the segments 209, 210, and 211 in order to enable the LAN Ethernet bypass pathway. Moreover, the RJ45 connector (serial connector) 203 can be accessed through the WIFI transceiver 207.

In the absence of such a detection of the failure in the operation of the debugging device 200, traffic is processed through (that is, without bypassing) the LACP controller (link aggregator) 206 and so forth. Thus, in such absence, both serial console output and Ethernet management port output can be sent from device 200 using WIFI or Ethernet to an application in another device (e.g., the WIFI enabled device 340 shown in FIG. 3). For example, the serial, console output and the Ethernet management port output can be provided to a display device of the WIFI enabled device 340. In this way, service interruption is avoided.

The LACP controller (link aggregator) 206 applies various combining (aggregating) methods to multiple network connections (e.g., RJ45 202 and RJ45 203) in parallel in order to increase throughput beyond what a single connection could sustain, and to provide redundancy in case one of the links should fail.

In the embodiment shown in FIG. 2, at least one of the elements of system 200 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of system 200 are readily determined by one of ordinary skill in the art, given the teachings of the present invention provided herein, while maintaining the spirit of the present invention.

FIG. 3 shows an exemplary environment 300 to which the present invention can be applied, in accordance with an embodiment of the present invention.

The environment 300 includes a server 310, a debugging device 320 (which can be implemented by debugging device 200 of FIG. 2), a switch to an internal network 330 (hereinafter interchangeably referred to as "switch" in short), external user devices e.g., in the example of FIG. 3, a smartphone 340A and a tablet 340B) collectively denoted by the figure reference numeral 340, an external user device (e.g., in the example of FIG. 3, a Personal Computer (PC)) 350, a switch to an internal network (hereinafter interchangeably referred to as "switch" in short) 360, and an internal network 370.

The debugging device 320 includes a serial port 321, an Ethernet port 322, a LAN Ethernet port 323, and a WIFI transceiver 324.

The server 310 includes a serial console 311 and a management port 312. The serial console 311 of the server 310 is operatively coupled to the serial port 321 of the debugging device 320. The management port 312 of the server 310 is operatively coupled to the Ethernet port 322 of the debugging device 320.

The switch 330 includes a LAN Ethernet port 331 and a LAN Ethernet port 332. The LAN Ethernet port 331 of the switch 330 is operatively coupled to the LAN Ethernet port 323 of the device debugging 320.

The external user device (PC) 350 includes a LAN Ethernet, port 351. In an embodiment, the external user device (PC) 350 can also include a WIFI transceiver.

The switch 360 includes a LAN Ethernet port 361 and a LAN Ethernet port 362. The LAN Ethernet power port 361 of the switch 360 is operatively coupled to the LAN Ethernet port 351 of the external user device (PC) 350.

The internal network 370 includes a WIFI transceiver 371 and LAN Ethernet ports 372 and 373. The LAN Ethernet port 372 of the internal network 370 is operatively coupled to the LAN Ethernet port 332 of the switch 330, and the LAN Ethernet port 373 of the internal network 370 is operatively coupled to the LAN Ethernet port 362 of the switch 360.

The external user devices (smartphone and tablet) 340 include a WIFI transceiver 341. The WIFI transceiver 341 of the external user devices 340 can be operatively coupled to the WIFI transceiver 371 of the internal network 370 and to the WIFI transceiver 324 of the debugging device 320. In an embodiment, the external user devices (smartphone and tablet) 330 can also include a LAN Ethernet port.

Upon a detection of a failure in the proper operation of the debugging device 320, the debugging device 320 can send serial console output to the external user devices 340 (through the WIFI transceivers 324 and 341). Similarly, upon a detection of a failure in the proper operation of the debugging device 320, the debugging device 320 can send Ethernet management port output from the server 310 to the external user device (PC) 350 (through the LAN Ethernet ports 323, 331, 332, 372, 373, and 362). Of course, in the case that any of the external user devices 340 and 350 have both wired (e.g., Ethernet) and wireless (e.g., WIFI) communication capabilities, then any of such external user devices 340 and 350 could receive both the serial console output and the Ethernet management port output from the server 310.

The serial console output and the Ethernet management port output from the server 310 can thus be sent to the external user devices 340 and 350 wirelessly or using a wired approach in order for the user of the external user devices 340 and 350 to interact with the server 310, even in the event of a failure.

FIG. 4 shows an exemplary method 400 for providing and using a debugging device with a serial and Ethernet console module and a hardware bypass, in accordance, with an embodiment of the present invention. The debugging device can be one as shown and described with respect to FIG. 2.

At step 410, access, by a debugging device associated with an external user device, a serial console of a hardware network device. In an embodiment, the hardware net work device can be any of, for example, a network security product, a network switch, a server, and so forth. In an embodiment, the external user device can be, for example, a smartphone, a personal computer, a tablet, and so forth.

At step 420, access, by the debugging device, a management Ethernet port of the hardware network device.

At step 430, provide, by the debugging device, a serial console interface from the serial console of the hardware network device to the external user device.

At step 440, provide, by the debugging device, a management Ethernet interface from the management Ethernet port of the hardware network device to the external user device.

At step 450, interact with the hardware network device by the external user device, using the serial console interface and the management Ethernet interface of the debugging device.

At step 460, responsive to the debugging device improperly operating, send (i) Ethernet management traffic from the hardware network device to the external user device through an internal network using a hardware bypass in the debugging device, (ii) serial traffic from the hardware network device to the external user through a wireless transceiver of the debugging device. The Ethernet management traffic can be sent from the hardware network device to the external user device using a wireless transceiver of the internal network.

The determination, or status, that the debugging device is improperly operating can be ascertained based on a status of the switch segments 209, 210, and 211. For example, the debugging device can be considered to be operating properly when the switch segments 209, 210, and 211 are in their normal operating positions (that is, closed for switch segments 209 and 210, and open for switch segment 211), while the debugging device can be considered to be improperly operating when the switch segments 209, 210, and 211 are in their non-normal operating positions (that is, open for switch segments 209 and 210, and closed for switch segment 211).

Thus, in an embodiment, a hardware bypass is integrated in the case when the debugging device 200/320 fails so that a user/customer will have the ability to view their server (or other network device) and have almost no outage at failure point The debugging device 200/320 also, provides the, ability to stream and receive commands from an application on an external user device a smartphone, a tablet, a PC, etc.) through WIFI or LAN.

The debugging device 200/320 is integrated with an application on an external user device such as, for example, a smartphone, a tablet, a personal computer, and so forth. The application software will render and interact with the stream from the debugging device 200/320 through WIFI or LAN. If the debugging device fails, then a hardware bypass will come into play and pass all Ethernet management traffic from the server (or other network device) to the internal network. An external, user device such as a personal computer will then be able to still access the server (or other network device) through the software application depending on the server's (or other network device's) configuration.

The present invention may be a system, a method, and/or a computer program product at any possible technical detail level of integration. The computer program product may include a computer readable storage medium (or media) having computer readable program instructions thereon for causing a processor to carryout aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Hash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program Instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention it will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data Processing apparatus to Produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention.

In this regard, each block, in the flowchart or block diagrams may represent a module, segment, or portion of instructions, which comprises one or more executable instructions for implementing the specified logical functions). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special propose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the, first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are, intended to be illustrative and not limiting), it is noted that modifications and variations can be made by persons skilled in the an in light of the above teachings. It is therefore to be understood that changes may be made in, the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method, comprising:
accessing, by a debugging device associated with an external user device, (i) a serial console of a hardware network device, and (ii) a management Ethernet port of the hardware network device;
providing, by the debugging device, (i) a serial console interface from the serial console of the hardware network device to the external user device, and (ii) a management Ethernet interface from the management Ethernet port of the hardware network device to the external user device;
receiving, by serial console interface and the management Ethernet interface of the debugging device, user input from the external user device; and
sending, using a hardware bypass in the debugging device, Ethernet management traffic from the hardware network device to an internal network located outside of the debugging device using a wired connection and from the internal network to the external user device using a wireless connection, responsive to the debugging device improperly operating.

2. The method of claim 1, wherein the hardware network device comprises a device selected from the group consisting of a network security product, a network switch, and a server.

3. The method of claim 1, wherein the external user device comprises a device selected from the group consisting a smartphone, a personal computer, and a tablet.

4. The method of claim 1, further comprising configuring the internal network to send the Ethernet management traffic from the hardware network device to the external user device using a wireless transceiver.

5. The method of claim 1, further comprising enabling the hardware bypass responsive to a change in operational status of one or more hardware switches.

6. The method of claim 5, wherein the change in operational status of the one or more hardware switches physically enables the hardware bypass.

7. The method of claim 1, further comprising aggregating, by a link aggregator, the Ethernet management traffic from the management Ethernet port of the hardware device and serial traffic from the serial console of the hardware device, and wherein the hardware bypass bypasses the link aggregator.

8. The method of claim 1, wherein the Ethernet management traffic is selectively sent from the hardware network device to the external user device using a wireless communication option or a wired communication option depending upon a communication capability of the external user device.

9. A debugging device, associated with an external user device, for interfacing a hardware network device with the external user device, the debugging device comprising:
a serial port for accessing a serial console of the hardware network device;
an Ethernet port for accessing a management Ethernet port of the hardware network device;
a serial console interface from the serial console of the hardware network device to the external user device; and
a management Ethernet interface from the management Ethernet port of the hardware network device to the external user device,
wherein the serial console interface and the management Ethernet interface are configured to interact with the hardware network device through the external user device, and
wherein the debugging device further comprises a hardware bypass configured to send Ethernet management traffic from the hardware network device to the external user device through an internal network located outside of the debugging device, responsive to the debugging device improperly operating, and wherein the debugging device further comprises:
a wired connection for sending the Ethernet management traffic from the debugging device to the internal network; and
a wireless transceiver for sending serial traffic from the debugging device to the external user device,
wherein the Ethernet management traffic is sent from the internal network to the external user device using a wireless transceiver of the internal network.

10. The debugging device of claim 9, wherein the hardware network device comprises a device selected from the group consisting of a network security product, a network switch, and a server.

11. The debugging device of claim 9, wherein the external user device comprises a device selected from the group consisting a smartphone, a personal computer, and a tablet.

12. The debugging device of claim 9, further comprising configuring the internal network to send the Ethernet management traffic from the hardware network device to the external user device using a wireless transceiver.

13. The debugging device of claim 9, further comprising one or more hardware switches, wherein the hardware bypass is enabled responsive to a change in operational status of the one or more hardware switches.

14. The debugging device of claim 13, wherein the change in operational status of the one or more hardware switches physically enables the hardware bypass.

15. The debugging device of claim 9, further comprising a link aggregator for aggregating the Ethernet management traffic from the management Ethernet port of the hardware device and serial traffic from the serial console of the hardware device, and wherein the hardware bypass bypasses the link aggregator.

16. The debugging device of claim 9, wherein the Ethernet management traffic is selectively sent from the hardware network device to the external user device using a wireless communication option or a wired communication option depending upon a communication capability of the external user device.

* * * * *